No. 691,165. Patented Jan. 14, 1902.
G. W. McGILL.
FASTENING DEVICE.
(Application filed Mar. 11, 1901.)
(No Model.) 2 Sheets—Sheet 1.

Witnesses:

Inventor
George W. McGill
By James L. Norris
Atty.

THE NORRIS PETERS CO., PHOTO-LITHO., WASHINGTON, D. C.

No. 691,165. Patented Jan. 14, 1902.
G. W. McGILL.
FASTENING DEVICE.
(Application filed Mar. 11, 1901.)
(No Model.) 2 Sheets—Sheet 2.
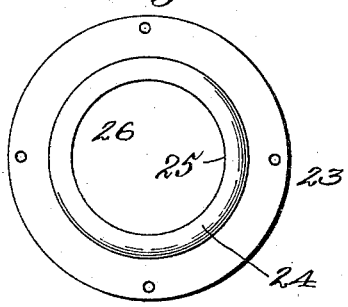
Fig. 9.
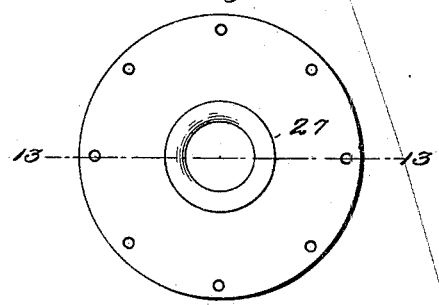
Fig. 12.
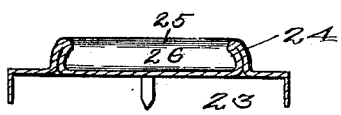
Fig. 10.
Fig. 13.
Fig. 11.
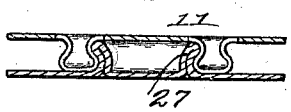
Fig. 14.
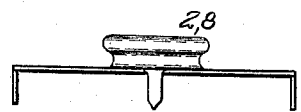
Fig. 15.
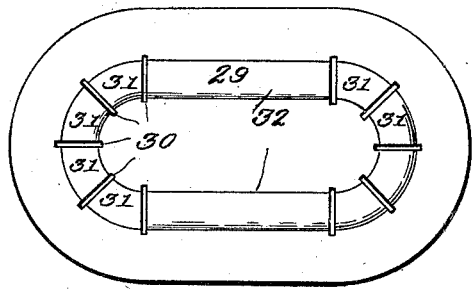
Fig. 17.
Fig. 16.
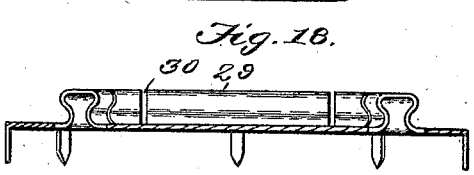
Fig. 18.
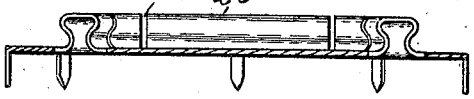
Witnesses:
Inventor
George W. McGill
By James L. Norris
Atty.
THE NORRIS PETERS CO., PHOTO-LITHO., WASHINGTON, D. C.

UNITED STATES PATENT OFFICE.

GEORGE W. McGILL, OF RIVERDALE-ON-THE-HUDSON, NEW YORK.

FASTENING DEVICE.

SPECIFICATION forming part of Letters Patent No. 691,165, dated January 14, 1902.

Application filed March 11, 1901. Serial No. 50,709. (No model.)

*To all whom it may concern:*

Be it known that I, GEORGE W. McGILL, a citizen of the United States, residing at Riverdale-on-the-Hudson, New York city, in the county of New York and State of New York, have invented new and useful Improvements in Spring-Buttons or Fastening Devices, of which the following is a specification.

My invention relates to spring-buttons or fastening devices for garments, leather purses, and similar articles, the same being particularly adapted for use in closing the flaps for same, and has for its object providing a flat connection between the two parts of the garment or other article which is at the same time firm and secure.

Other objects and advantages of the invention will hereinafter appear, and the novel features thereof will be set forth in the claims.

Figure 1:
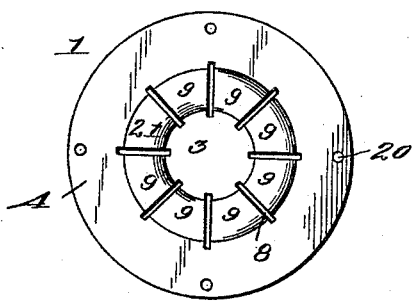
Figure 2:
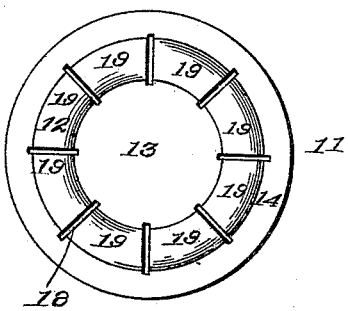
Figure 3:
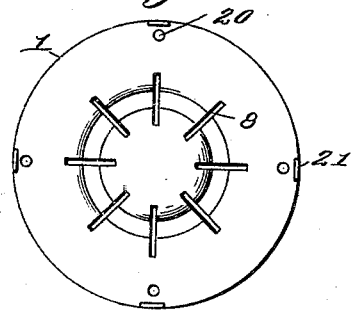
Figure 4:
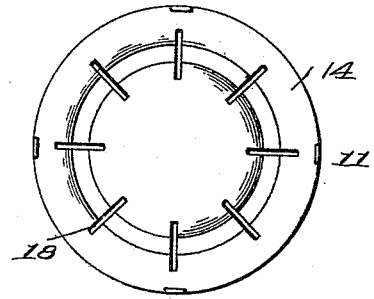
Figure 5:
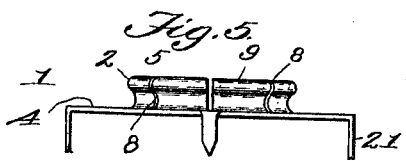
Figure 6:
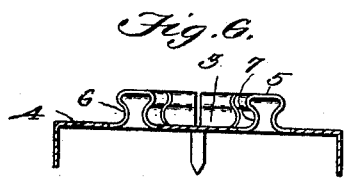
Figure 7:
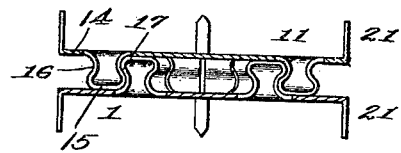
Figure 8:
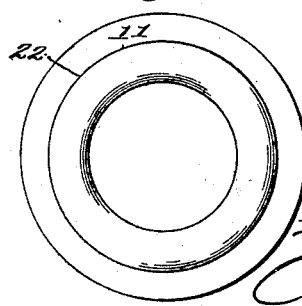

In the drawings forming a part of this specification, Figure 1 is a top plan view of the stud member. Fig. 2 is a similar view of the socket member. Fig. 3 is a bottom plan view of the stud member. Fig. 4 is a similar view of the socket member. Fig. 5 is a side elevation of the stud member. Fig. 6 is a vertical central section of the same. Fig. 7 is a similar section of the stud and socket members in interlocking relation. Fig. 8 is a top plan view of a modified form of the socket member. Fig. 9 is a similar view of another modified form of socket member. Fig. 10 is a vertical central section of the same. Fig. 11 is a similar view of the socket member shown in Figs. 9 and 10 in interlocking relation with a stud member. Fig. 12 is a plan view of a modified form of stud member. Fig. 13 is a section on the line 13 13 of Fig. 12. Fig. 14 is a similar view of the stud member shown in Figs. 12 and 13 in interlocking relation with a socket member. Fig. 15 is a side elevation of another modified from of stud member. Fig. 16 is a sectional elevation of the same shown in interlocking relation with a socket member. Figs. 17 and 18 are plan and sectional views, respectively, of a modified construction, the same being shown in elongated or elliptical form.

Like reference-numerals indicate like parts in the different views.

The stud member 1 is formed from a flat disk of sheet metal bent or struck up around the center thereof to form an annular crown 2, which constitutes the stud. The base of the cavity 3 within the stud 2 lies in the same plane with the base-flange 4 outside said stud, and the upper surface of the stud 2 is flattened, as shown at 5. The opposite sides 6 and 7 of the stud 2 converge from the flat portion 5 toward the bottom of the cavity or socket-chamber 3 and the base-flange 4, and the corners at the meeting points of said sides 6 and 7 with the flat portion 5 and with the base-flange 4 and bottom of the cavity or socket-chamber 3 are rounded, as clearly shown. The stud 2 has cut in it a plurality of radial slots 8 8, which produce the spring-sections 9 9. The slots 8 extend from the flat top portion 5 of the stud 2 down through the inner portion of base-flange 4 and the outer portion of the bottom of the cavity 3, as clearly shown in Figs. 3 and 6 of the drawings. By this construction of the stud 2 provision is made for the lateral compression or spring of the different sections 9 thereof and the automatic return of the same to their normal positions when the pressure thereon is relieved. The socket member 11 is also made from a disk of sheet metal of a size and shape corresponding to that of the stud member 1 and is bent or struck up around the center to form an annular crown 12, similar in all respects to the crown 2 of the stud member, except that it is of larger diameter. The cavity 13 within the annular crown 12 of the socket member extends down to the plane of the base-flange 14, as shown in Fig. 7 of the drawings, and constitutes the socket proper, which is adapted to receive the stud 2, above referred to. The top 15 of the crown 12 is flat, and the sides 16 and 17 of the crown 12 converge toward each other similar to the corresponding sides of the stud 2. Extending radially through the crown 12 of the socket member are the slots 18, which produce the spring-sections 19. Said slots 18 extend down through the inner portion of the base-flange 14 and through the outer portion of the bottom of the cavity 13, as clearly shown in Fig. 7 of the drawings. By this construction the spring-sections 19 are adapted to be moved laterally against the resilience of the material of which they are made and to return automatically to their normal positions as soon as the pressure thereon is relieved and also admits of their alternate vertical movement. The socket member 11 is made in such proportions as to properly cooperate with the stud member 1, so that the two may be retained in interlocking relation one with the other, but may upon the application of pressure be readily separated—that is, the cavity 13, which constitutes the socket proper or socket-chamber, has its mouth or contracted portion of smaller diameter than the upper flattened end 5 of the stud 2, so that when said stud is introduced into the socket or cavity 13 the spring-sections 9 of said stud will be compressed inwardly toward the center, and the spring-sections 19 of the crown 12 will be forced outwardly until the flat end 5 of the stud 2 passes beyond the contracted throat of the socket or cavity 13 and seats itself within the wide or enlarged portion of said cavity. When thus in place, the inclined walls 6 of the stud 2 bear against the inclined walls 17 of the crown 12, which surrounds the cavity or socket 13. Danger of accidental disconnection of the two parts is effectually prevented and a secure locking action between the two provided, with the two parts of the cloth to which the different members are connected lying in comparatively close contact one with the other.

The stud and socket members may be provided with openings 20, by means of which the same may be stitched to the article of apparel upon which they are to be used, or the same may be secured in place by means of the prongs 21. (Shown in Fig. 5 of the drawings.) The said prongs extend downwardly from the base-flange and are adapted to be introduced through the goods and clenched on the under side thereof. Either of these securing devices may be employed or both may be formed upon the two members of the device. If the device is provided with both of these attaching means and it is not desired to use the prongs 21, the same may be either broken off or folded inwardly against the base-flange and lie in contact with the upper surface of the goods. When it is desired to produce a stiffer or less-pliable spring connection between the two members of the device, the crown of one of the members may be made imperforate—that is to say, the radial slots which divide the crown up into spring-sections may be dispensed with. In consequence of the omission of the slots an inelastic or rigid crown-piece is produced, into which or around which the crown-piece of the correlative part may be introduced.

The crown 22 (shown in Fig. 8 of the drawings) is unslotted and is of the same shape as the corresponding crowns illustrated in the preceding figures. When, however, the unslotted crown is employed on the socket member, the said crown may have its sides lying parallel to or in contact with each other and bent inwardly, as shown in Figs. 9, 10, and 11 of the drawings. The socket member 23 in these figures has the unslotted or imperforate crown 24 thereof bent or crimped inwardly at its outer end to form a contracted throat 25 for the cavity or socket proper, 26. This form of socket member may be used in connection with the stud member 1, substantially as shown in Figs. 1, 3, 5, 6, 7, and 11 of the drawings. When used on the stud member, the imperforate or unslotted crown thereof may be bent or spread outwardly to form a stud 27, as shown in Figs. 12, 13, and 14 of the drawings. The stud 27 may be used in connection with the socket member 11, substantially as shown in Figs. 2, 4, 7, and 14 of the drawings. The stud member may also be formed with a rigid central stud 28, as shown in Figs. 15 and 16 of the drawings, adapted to coöperate with the form of socket member illustrated in Figs. 2, 4, and 7.

The device has heretofore been referred to as being constructed from a disk of sheet metal circular in form. I do not, however, limit myself to this shape of the stud and socket members, as they may be and it is frequently desirable that they be of elongated or elliptical shape, as shown in Figs. 17 and 18 of the drawings. The crown 29 in this form of my invention is provided at its rounded ends with radial slots 30, producing the spring members 31, but has straight equidistant or parallel sides 32, which are imperforate or unslotted. This form of my device provides a construction in which lateral or horizontal turning movement of one member with respect to the other is prevented and one in which, by reason of the elongated equidistant or parallel sides 32, a stiff spring locking action is produced. The invention in all of its forms is extremely simple in construction and effective in operation, each member being made from a single strip or disk of sheet metal and adapted to lie so close to the other that the parts of the fabric to which they are respectively secured will be retained in a practically flat condition.

An important feature of this device is the novel construction and operation of the annular interlocking spring-crowns of each of its members, consisting in a series of radially-arranged looped spring-sections, each provided with two separate and separated diverging arms or stems connecting at their divergent top parts by a flat bridging part spanning the space between them and webbed at their bottom parts, respectively, to the outer circumference of the bottom of the cavity or socket-chamber of the member and to the inner circumference of its encircling flange. This novel construction of the annular crown of both members imparts to each of the radially-arranged spring-sections composing such crowns a twofold resilient force or power in their alternating lateral movements, and does so by reason of the two separate arms of such sections oscillating in unison through their loop or top connection on two independent and separated axes. This novel construction also imparts to each of such spring-sections six distinct points and sources of active resilience—to wit, two where each section connects integrally with or is webbed to the base of the socket-chamber and to the outer flange of the member, respectively, two at the points or vertex where the two arms of each section project upwardly from such socket-chamber base and flange, respectively, on diverging lines, and two where such arms connect integrally with the connecting flat looping top of such section. When any one or all of these spring-sections is pressed inwardly or toward the central part of the annular crown, six different and distinct movements take place therein, to wit: The acute angle formed by the outer arm of the section connecting with the flange of the member is widened and becomes less acute. So, also, with the acute angle formed by such arm and the flat top of the section, while the two angles formed by the inner arm of the section with such flat top and the base of the socket-chamber are contracted and become more acute. When all or any one of such spring-sections are moved in the opposite direction or outwardly from the annular crown they compose, their duplex arms and angular parts will describe reverse movements, and in both of said alternative lateral movements of the sections the slotted base part forming the heel or web of each section where it connects with the base of the socket-chamber and with the flange, respectively, is alternately depressed below and raised above the plane occupied by such flange and socket-chamber base, and such alternate vertical movement is secured by extending the radially-arranged slots providing such sections into the flange and socket-chamber base, as hereinbefore described, all of which movements facilitate the interlocking of the members of the device, increase the security of the connection so made, facilitate the ready intentional unlocking of the same when desired, and reduce to a minimum the liability to wearing out or exhaustion of the resilience of the parts by repeated locking and unlocking of the members.

Having now described my invention, what I claim as new, and desire to secure by Letters Patent, is—

1. In the spring-button or fastening device herein described, an interlocking member provided with a series of two-armed and looped spring-sections radially arranged around its center in manner to form an annular spring-crown therein, the looped top of the spring-sections forming the broad partly-flat top part of the crown, and the two arms of such sections forming the two concentric or parallel walls of the crown, such walls converging from the broad top part of the crown downward to the flange and central base part of the member, respectively, and integrally connecting therewith, and being divided into said radially-arranged spring-sections by slots radially disposed and extending down through such annular crown and intersecting the flange and central base part of such member, as and for the purposes herein set forth.

2. In a spring-button or fastening device, the combination with a socket member made from sheet metal bent or struck up to form a projecting annular crown, a base-flange outside said crown, and a cavity or socket within the same, the said crown having the upper surface thereof partly flat and the two annular concentric walls thereof converging from such partly-flat upper surface inwardly toward their base and there integrally connected respectively with the bottom of such socket and the outer or base flange of the member, the flat base of said socket lying in the same plane with said base-flange, and the said crown being provided with slots producing spring-sections, and said slots being radially disposed and extending down and intersecting said base-flange and the base of said socket or cavity, of a stud member having a stud thereon adapted to fit within said socket and interlock therewith.

3. In a spring-button or fastening device, the combination with a socket member made from sheet metal bent or struck up to form a projecting annular crown, a base-flange outside said crown, and a cavity or socket within the same, the said crown being provided with slots producing spring-sections, and said slots being radially disposed and extending down and intersecting said base-flange and the base of said socket or cavity, and said crown having a partly-flat top occupying a plane parallel with that of the base-flange and socket-base and having sides or annular concentric walls which converge from said top toward their base and connect at their base respectively with said outer flange and the bottom of said socket, of a stud member having a stud thereon adapted to fit within said socket and interlock therewith.

4. In a spring-button or fastening device, the combination with a socket member, of a stud member made from sheet metal bent or struck up to form a projecting annular crown constituting a stud, a base-flange outside said crown and a cavity within the same having a connecting-web at its lower end constituting a bottom, the said crown having two separated annular concentric walls connected at their top by a flat part spanning the space between them and converging downward toward each other and provided with slots producing spring-sections, said slots being radially disposed and extending down and intersecting said base-flange and the base of said cavity, and said spring-sections connected integrally with said base-flange and the base of said socket or cavity respectively.

5. In a spring-button or fastening device, the combination with a socket member, of a stud member made from sheet metal bent or struck up to form an annular projecting crown constituting a stud, a base-flange outside said crown and a cavity within the same, the said crown being provided with slots producing spring-sections, said slots being radially disposed and extending down and intersecting said base-flange and the base of said cavity, and said crown having a partly-flat top occupying a plane parallel to that of the base-flange and socket-base with annular concentric separated walls or sides which converge from said top to the crown-base where they connect integrally with the inner and outer base parts of the member respectively.

6. In a spring-button or fastening device, a member consisting of a metal plate or disk having an annular groove sunk or spun in one surface of the same producing an annular ridge or crown on its opposite surface with a central cavity or socket within such ridge or crown and an outer flange encircling the same, said annular ridge or crown being depressed or flattened on its top in manner to expand such top to a width greater than the annular space dividing the outer and inner walls of such crown at their base and toward which said walls converge, the crown so formed being divided by a plurality of slots radially disposed therein into a plurality of correspondingly-disposed spring-sections, each of such spring-sections being adapted to oscillate above the disk on two separate fulcrums provided by such slots and connecting with said disk.

7. In a spring-button or fastening device, a member consisting of a metal plate or disk having an annular groove sunk or spun in one surface of the same producing an annular ridge or crown on its opposite surface with a central cavity or socket within such ridge or crown and an outer flange encircling the same, said annular ridge or crown being depressed or flattened on its top in manner to expand such top to a width greater than the annular space dividing the outer and inner walls of such crown at their base and toward which said walls converge, the crown so formed being divided by a plurality of slots radially disposed therein into a plurality of correspondingly-disposed spring-sections webbed integrally at the base of their outer and inner arms, respectively, to the outer flange and inner socket-base, respectively, of the member, adapting such spring-sections to oscillate laterally and vertically therein.

8. In a spring-button or fastening device, the combination with a socket member having a projecting annular crown thereon forming an open stud-receiving cavity or socket within the same, the upper surface of said crown being flat except at its outer and inner periphery or edges where it rounds downward, the two concentric separated annular walls of the crown converging from its upper surface inwardly toward their base and connected at their base, respectively, with the bottom of such stud-receiving socket and the surrounding outer flange of the member, the said crown having slots radially disposed therein producing a plurality of correspondingly-disposed looped spring-sections adapted to oscillate laterally and vertically, of a stud member having a stud thereon adapted to fit within said socket and interlock therewith.

9. In a spring-button or fastening device, the combination with a stud member consisting of a metal plate or disk having an annular groove sunk or spun in one surface of the same producing an annular ridge or crown on its opposite surface with a central cavity or socket within such ridge or crown and an outer flange encircling the same, said annular ridge or crown being flattened on its top in manner to expand such top to a width greater than the annular space dividing the outer and inner walls of such crown at their base and toward which said walls converge, the crown so formed being divided by a plurality of slots radially disposed therein into a plurality of correspondingly-disposed looped spring-sections webbed integrally at the base of their outer and inner arms, respectively, to the outer flange and inner socket-base, respectively, of the member and adapting such spring-sections to oscillate laterally and vertically, of a socket member having an engaging socket or collar adapted to spring over and encircle the spring-sections composing such crown and interlock therewith.

10. In a spring-button or fastening device, the combination with a socket member having a projecting annular double-walled crown thereon forming an open stud-receiving cavity or socket within the same, of a stud member having a similar projecting annular double-walled crown thereon differentiated sufficient in diameter to form a stud adapted to fit within said socket and interlock therewith, the crown on each of said members being provided with slots radially disposed therein to produce a plurality of correspondingly-disposed looped spring-sections having flat tops and downward-converging sides which connect integrally with the central and outer base parts of the members respectively, and which oscillate laterally and vertically in manner to receive and hold by their resilience and the inner and outer overhanging surfaces of their upper parts, respectively, an engaging stud in the central cavity or socket between them and an engaging collar or socket sprung over and around them.

11. In a spring-button or fastening device, a metal disk struck up to produce within its periphery an annular projecting crown surrounding a central cavity or socket and an outside encircling flange, the central cavity having a connecting-web at its lower end forming a bottom and the crown having two annular concentric walls with an annulus or annular space between them, said space being spanned and connected above by a partly-flat top connecting with said walls, and said walls converging downward toward their base where they connect with the outside encircling flange and the base of the central cavity respectively, the crown thus formed being divided by vertical slots radiating from its center and continued down through the inner circumference of its encircling flange and the outer circumference of the base of its central socket completely dividing it into a plurality of spring members integral with its encircling flange and with the base or bottom of its central socket and adapting the entire crown to expand in passing over the head of an engaging stud and to contract in entering the mouth of an engaging socket.

12. In a spring-button or fastening device the combination with an elongated socket member, of a stud member of similar formation and suitable size, both members having a projecting elongated annular hollow ridge or crown struck on one of their surfaces, the unstruck central part of such surfaces forming an elongated cavity or socket within the circumference of such crowns, each crown being formed of two equidistant or parallel elongated walls spanned and connected by a partly-flat top, said walls converging downward toward their base where the outer wall connects with the elongated outer base-flange and the inner wall with the imperforate base of the central elongated cavity or socket, the crowns so formed, of one or both members, being divided at their rounded ends by slots into a plurality of curved spring end members and straight parallel side members adapting the entire crown to expand in passing over the head of an engaging stud and to contract in entering the mouth of an engaging socket whereby the engaging power of said spring members is increased and all tendency on the part of the socket and stud members to lateral or revolving movement while in locking relation with each other, prevented.

In testimony whereof I have hereunto set my hand in presence of two subscribing witnesses.

GEORGE W. McGILL.

Witnesses:
HENRY KASEFANZ,
JAMES W. REDMAN.